(12) United States Patent
Huang et al.

(10) Patent No.: US 7,548,160 B2
(45) Date of Patent: Jun. 16, 2009

(54) ANTI-THEFT ALARM SYSTEM FOR PORTABLE COMPUTER

(75) Inventors: Mao-Chang Huang, Tu-Cheng (TW); Lien-Fa Chen, Tu-Cheng (TW); Lei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,763

(22) Filed: Sep. 22, 2006

(65) Prior Publication Data

US 2007/0152820 A1 Jul. 5, 2007

(51) Int. Cl.
*G08B 13/14* (2006.01)
(52) U.S. Cl. .................................. 340/568.1
(58) Field of Classification Search ............ 340/568.1, 340/571, 384.1, 545.4; 116/4, 77
See application file for complete search history.

(56) References Cited

U.S. PATENT DOCUMENTS

| | | | | |
|---|---|---|---|---|
| 4,985,695 | A | * | 1/1991 | Wilkinson et al. ....... 340/568.3 |
| 5,578,991 | A | * | 11/1996 | Scholder ..................... 340/571 |
| 5,936,526 | A | | 8/1999 | Klein |
| 6,172,607 | B1 | * | 1/2001 | McDonald .................. 340/571 |
| 7,245,175 | B2 | * | 7/2007 | Morita ........................ 327/427 |
| RE40,012 | E | * | 1/2008 | Patterson .................... 340/571 |

* cited by examiner

*Primary Examiner*—Phung Nguyen
(74) *Attorney, Agent, or Firm*—Wei Te Chung

(57) ABSTRACT

An anti-theft alarm system includes a detecting switch portion including a first switch and a second switch, a keyboard controller (KBC), and a key of a keyboard of the portable computer for enabling the alarm system. If the portable computer is moved without deactivation of the alarm system, the second switch opens, causing a change of a voltage at the first switch which is detected by the KBC, the KBC thereby sends an alarm control signal to an audio system of the portable computer, and the audio system produces an audible sound for a theft deterrence effect.

17 Claims, 4 Drawing Sheets

ANTI-THEFT ALARM SYSTEM FOR PORTABLE COMPUTER

CROSS-REFERENCE TO RELATED APPLICATION

Reference is made to a copending U.S. Patent Application entitled "ANTI-THEFT ALARM SYSTEM FOR PORTABLE COMPUTER," filed on Aug. 18, 2006, with application Ser. No. 11/309,535, and assigned to the same assignee as that of the present invention.

Field of the Invention

The present invention relates to an alarm system, and particularly to an anti-theft alarm system for a portable computer.

Description of Related Art

Portable computers, as opposed to desktop computers, provide benefits to their users in direct proportion to their small size. Technology has expanded to allow small laptops and notebooks and even smaller palm-sized or hand-held portable computers. The benefits of small size allow portable computers to be carried from place to place with a minimum of effort while taking up very little room in backpacks or briefcases.

As portable computers are made smaller and lighter, they are also made easier to conceal. The fact that these computers are easy to transport and conceal leads to an increase in the amount of theft of such systems. Portable computers are generally stolen by people who may see one lying unattended and simply pick it up and place it in their briefcase.

What is needed, therefore, is an anti-theft alarm system for a portable computer which can provide a sounding of an alarm upon unauthorized movement of the portable computer.

SUMMARY OF THE INVENTION

An anti-theft alarm system for a portable computer is provided. In a preferred embodiment the anti-theft alarm system includes a keyboard controller (KBC), a key of a keyboard of the portable computer for enabling the alarm system, and a detecting switch portion including a first switch and a second switch. When the KBC outputs an enable signal to the first switch, the alarm system is active and protecting the portable computer from theft. If the portable computer is moved without deactivation of the alarm system, the second switch opens, causing a change of a voltage at the first switch which is detected by the KBC, the KBC thereby sends an alarm control signal to an audio system of the portable computer, and the audio system produces an audible sound for a theft deterrence effect.

Other advantages and novel features will become more apparent from the following detailed description when taken in conjunction with the accompanying drawings, in which:

DETAILED DESCRIPTION OF THE INVENTION

Figure 1:
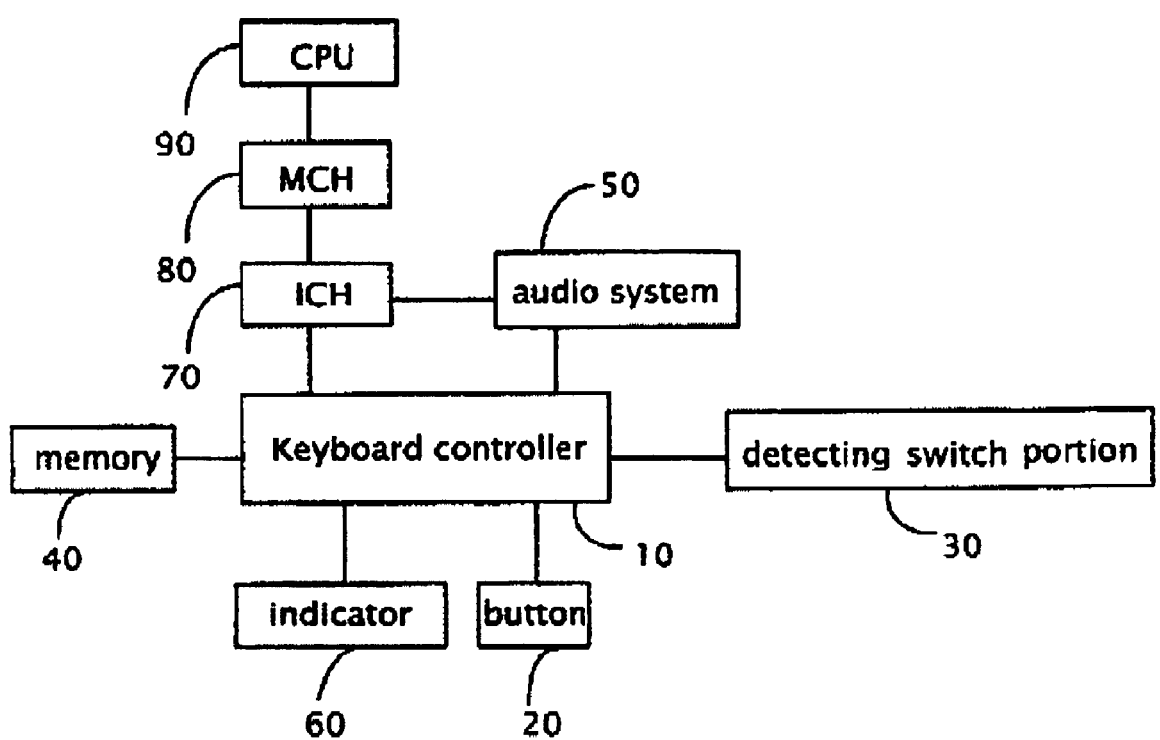
FIG. 1 is a schematic diagram of an anti-theft alarm system for a portable computer, in accordance with a preferred embodiment of the present invention.

FIG. 1 shows an anti-theft alarm system for a portable computer, in accordance with a preferred embodiment of the present invention. The anti-theft alarm system includes a keyboard controller (KBC) 10, an enable/disable button 20, a detecting switch portion 30, and a memory 40, an audio system 50, a light emitting diode (LED) indicator 60, an input/output controller hub (ICH) 70, a memory controller hub (MCH) 80, a central processing unit (CPU) 90.

The button 20 is connected to a general purpose wake up pin of the KBC 10, for delivering an alarm system enable or disable signal to the KBC 10. The button 20 can be a key of a keyboard of the portable computer suitably configured and programmed. The detecting switch portion 30 is provided for detecting unauthorized movement of the portable computer away from a supporting surface. The detecting switch portion 30 is connected to the KBC 10 and when unauthorized movement of the portable computer is detected, the detecting switch portion 30 will send an alarm signal to the KBC 10. The memory 40 is used to store data processed by the KBC 10, e.g. a user password to be input to the portable computer for enabling and/or disabling the alarm system. The indicator 60 is connected to a general-purpose input/output pin of the KBC10, for indicating whether the alarm system is enabled or not. When the alarm system is disabled, the indicator 60 is unlit. When the alarm system is enabled, the indicator 60 is lit. While the alarm system is enabled, if unauthorized movement is detected, the indicator 60 blinks. The KBC 10 is connected to the CPU 90 via the ICH 70 and the MCH 80. The audio system 50 is also connected to the CPU 90 via the ICH 70 and the MCH 80.

Figure 2:
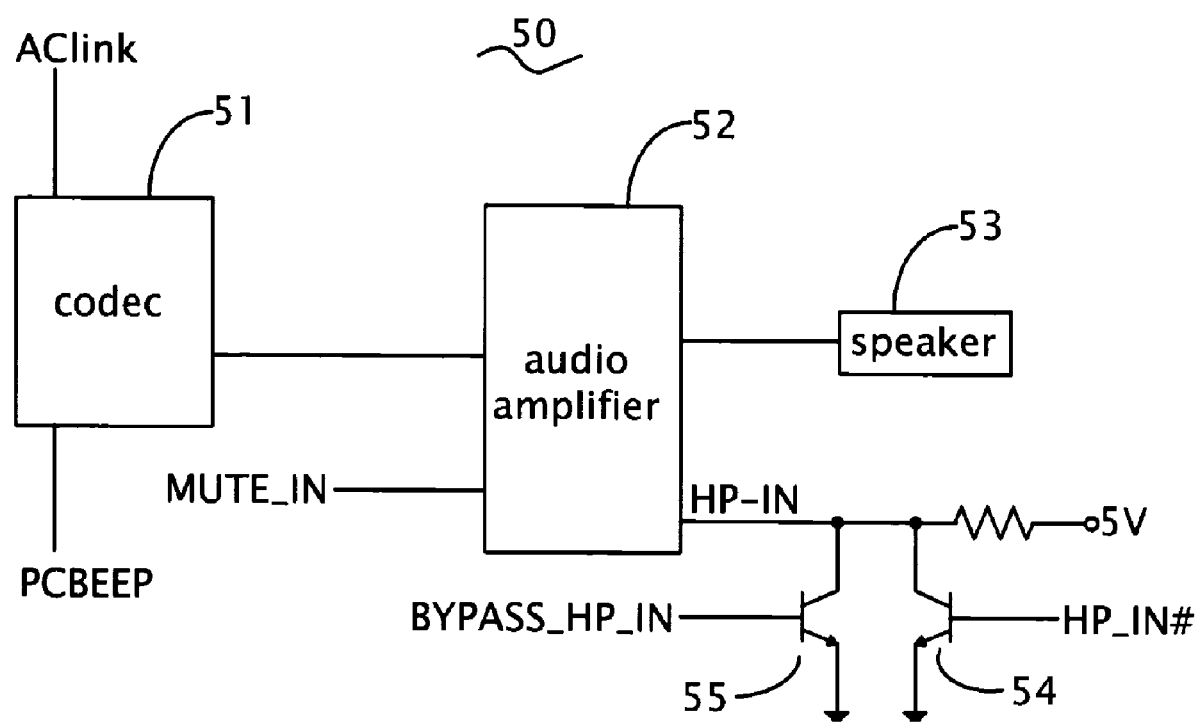
FIG. 2 is a schematic diagram of an audio system of FIG. 1, in accordance with a preferred embodiment of the present invention.

As shown in FIG. 2, the audio system 50 is an existing system of the portable computer. The audio system 50 includes an AC97 codec 51, an audio amplifier 52, a speaker 53, and transistors 54, 55. The KBC 10 provides an alarm-controlling signal PCBEEP to the audio system 50 when the KBC 10 receives the alarm signal. The codec 51 is connected to the ICH 70 via an AC-link interface. Collectors of the transistors 54, 55 are connected to an earphone input HP-IN of the audio amplifier 52. Emitters of the transistors 54, 55 are connected to ground. A base of the transistor 54 is used for receiving an earphone interface input HP-IN#. A base of the transistor 55 is used for receiving an earphone bypass input BYPASS-HP-IN from the KBC 10. The speaker 53 sounds an alarm only if the earphone input HP-IN of the audio amplifier 52 is at a low level.

Figure 3:
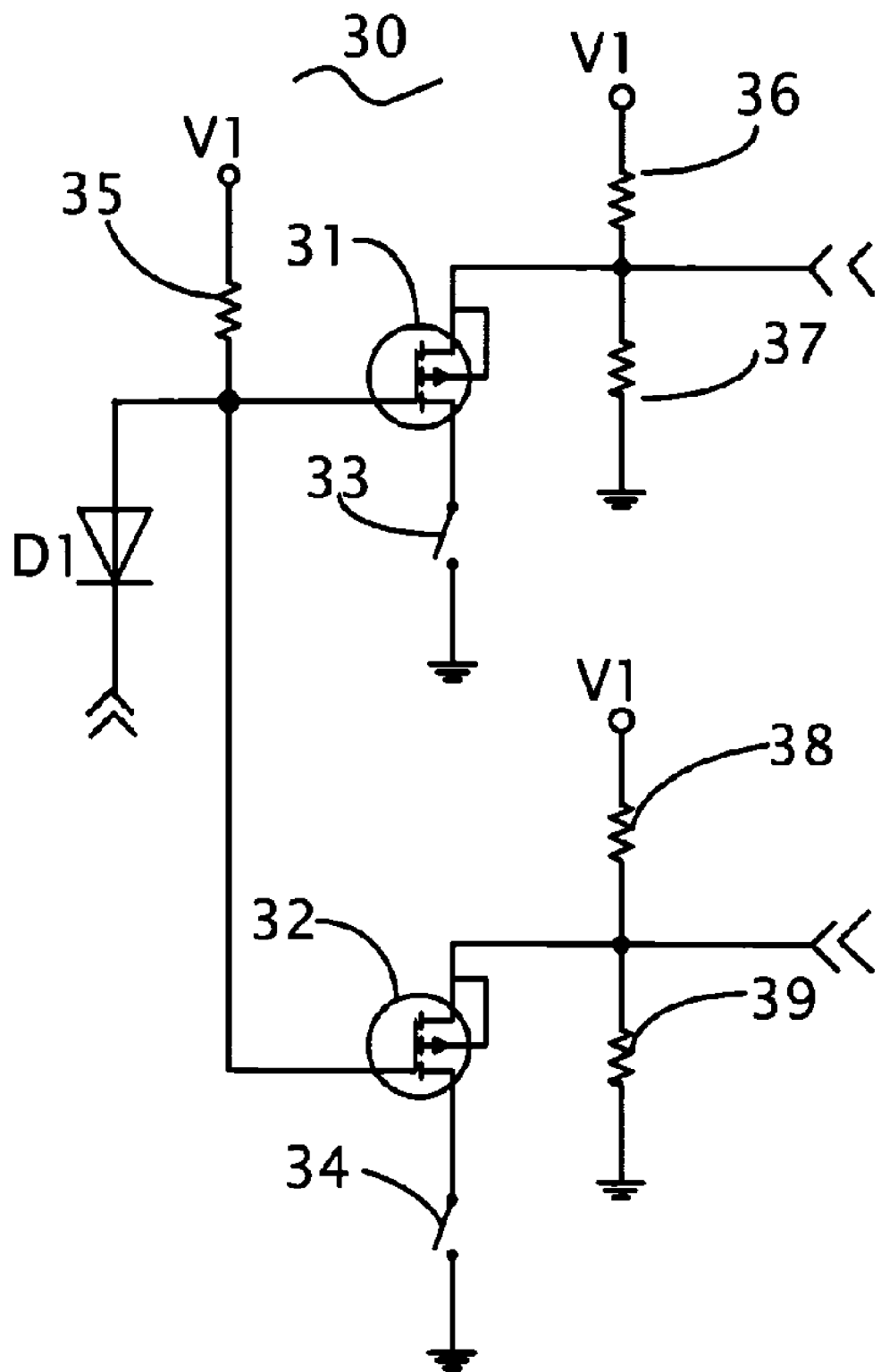
FIG. 3 is a schematic diagram of a detecting switch portion of FIG 1, in accordance with a preferred embodiment of the present invention.

As shown in FIG. 3, the detecting switch portion 30 includes a diode D1, metallic oxide semiconductor field effect transistors (MOSFETs) 31, 32, mechanical switches 33, 34, and resistors 35, 36, 37, 38, 39. Gates of both of the MOSFETs 31, 32 are connected to the KBC 10 via the diode D1, and a 3.3V-voltage input V1 via the resistor 35. A source of the MOSFET 31 is connected to the voltage input V1 via the resistor 36, ground via the resistor 37, and the KBC 10. The switch 33 is connected between the drain of the MOSFET 31 and ground. A source of the MOSFET 32 is connected to the voltage input V1 via the resistor 38, ground via the resistor 39, and the KBC 10. The switch 34 is connected between the drain of the MOSFET 32 and ground. When a cathode of the diode D1 receives a high-level disable signal from the KBC 10, voltages at the sources of the MOSFETs 31, 32 remain constant despite changes in open-close states of the mechanical switches 33, 34. When the cathode of the diode D1 receives a low-level enable signal from the KBC 10, and the mechanical switches 33, 34 switch from closed to open, the MOSFETs 31, 32 switch from on to off, and voltages at the sources of the MOSFETs 31, 32 change. The changes are sent as alarm signals to the KBC 10. The diode D1 serves to avoid leakage when the voltage input V1 is not provided and the high-level disable signal is provided.

Figure 4:
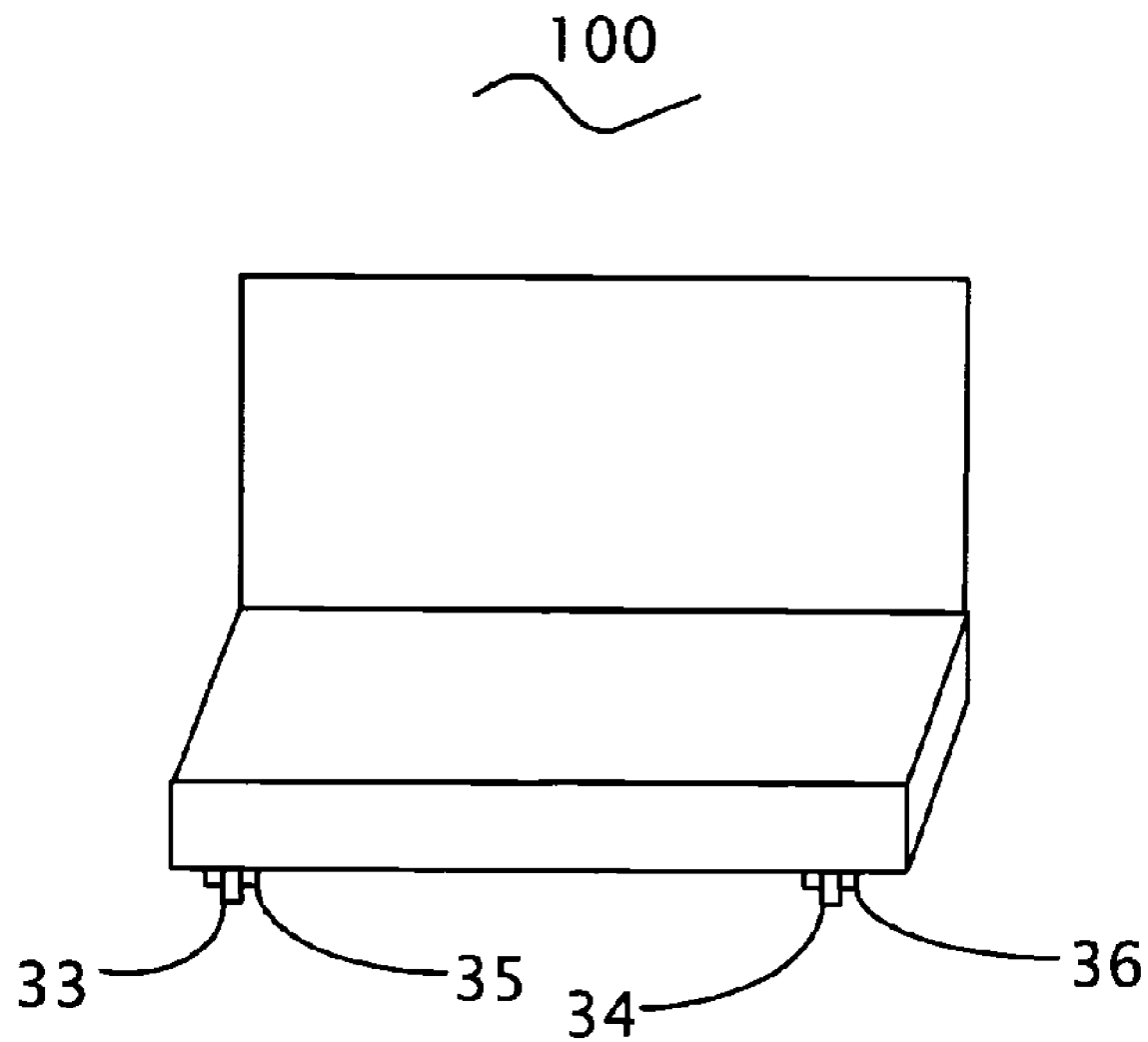
FIG. 4 is a schematic diagram of two switches mounted in the portable computer of FIG. 1, in accordance with a preferred embodiment of the present invention.

As shown in FIG. 4, the mechanical switches 33, 34 are respectively mounted in cushions 35, 36 of the portable computer 100 and deformable via an outside force. For example, when the portable computer 100 is placed on a supporting surface (not shown), the mechanical switches 33, 34 are depressed, that is, closed. When the portable computer 100 is moved away from the supporting surface, the mechanical switches 33, 34 release, that is, open.

When the alarm system enabling signal is input to the KBC 10 by pressing the button 20, an operating system, e.g. Windows or Linux, stores a status of a system volume control, a basic input/output system (BIOS) maximizes the system volume, and the KBC 10 outputs a mute-disabling signal MUTE-IN to the audio amplifier 52 for disabling a possible mute status of the audio system 50. Then the KBC 10 sets an alarm system enable flag in a register of the KBC 10, and the KBC 10 outputs the low-level enable signal to the detecting switch portion 30, enabling the detecting switch portion 30 to detect unauthorized movement of the portable computer.

Once the portable computer is moved away from the supporting surface, the first switch 33 and the second switch 34 are open. The detecting switch portion 30 thereby provides the alarm signals to the KBC 10. Then the KBC 10 outputs the alarm control signal PCBEEP to the codec 51, which converts the alarm control signal PCBEEP to an analog audio signal. Meanwhile the CPU 90 calls an audio driver. The audio amplifier 52 amplifies the analog audio signal and causes the speaker 53 to output with maximum system volume. The KBC 10 also provides a high-level earphone bypass input BYPASS-HP-IN to the base of the transistor 55 in order to make the earphone input HP-IN of the audio amplifier 52 at a low level. Therefore even if an earphone is plugged in to the portable computer at a time of unauthorized movement, the earphone interface input HP-IN# is at a low level, and the speaker 53 can still sound an alarm.

To disable the alarm system, the button 20 is pressed again. The alarm system disable signal is input to the KBC 10. A dialogue box asking for a password pops up on a display of the computer. When a correct password is input, the alarm system enable flag in the register of the KBC 10 is cleared. Then the KBC 10 outputs the high-level enable signal to the detecting switch portion 30, disabling the detecting switch portion 30 and the computer resuming a normal state.

In addition, the MOSFETs 31, 32 may alternatively be replaced with other suitable electrical switches such as bipolar junction transistors. For the portable computer 100 generally having four cushions, the number of the mechanical switches can be one, three, or four, and the number of corresponding MOSFET can be one, three, or four.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. An anti-theft alarm system for a portable computer, the anti-theft alarm system comprising:
   a detecting switch portion comprising an electronic switch and a mechanical switch;
   a keyboard controller (KBC) configured for outputting an enable signal to the electronic switch to activate the alarm system and protect the portable computer from theft, wherein a first terminal of the electronic switch is connected to the KBC and connected to a voltage input via a resistor, a second terminal of the electronic switch is connected to the voltage input via a resistor, grounded via a resistor, and connected to the KBC, the mechanical switch is connected between a third terminal of the electronic switch and ground;
   a key of a keyboard of the portable computer configured for delivering an alarm system enabling signal to the KBC and causing the KBC to output the enable signal, wherein
   if the portable computer is moved without deactivation of the alarm system, the mechanical switch opens, causing a change of a voltage at the electronic switch which is detected by the KBC, the KBC thereby sends an alarm control signal to an audio system of the portable computer, and the audio system produces an audible sound for a theft deterrence effect.

2. The anti-theft alarm system as claimed in claim 1, wherein the electronic switch is a metallic oxide semiconductor field effect transistor (MOSFET), the mechanical switch is mounted in a cushion of the portable computer and deformable via the weight of the portable computer.

3. The anti-theft alarm system as claimed in claim 1, wherein the detecting switch portion further comprises a diode connected between the first terminal of the electronic switch and the KBC for avoiding leakage.

4. The anti-theft alarm system as claimed in claim 1, wherein the audio system comprises:
   a speaker;
   a codec far converting the alarm control signal to an analog audio signal; and
   an audio amplifier for amplifying the analog audio signals to make the speaker sound an alarm.

5. The anti-theft alarm system as claimed in claim 4, wherein the audio system further comprises a transistor, the transistor having a collector connected to an earphone input of the audio amplifier, and a base receiving an earphone bypass input signal from the KBC for making the speaker sound the alarm even if an earphone is plugged into the portable computer.

6. The anti-theft alarm system as claimed in claim 4, wherein the KBC outputs a mute-disabling signal to the audio amplifier for disabling a possible mute status of the audio system.

7. The anti-theft alarm system as claimed in claim 1, further comprising a central processing unit connected to the audio system via a memory controller hub and an input/output controller hub for calling an audio driver when the KBC outputs the alarm control signal.

8. The anti-theft alarm system as claimed in claim 1, further comprising a memory connected to the KBC for storing a password to be input to the portable computer for enabling and/or disabling the alarm system.

9. The anti-theft alarm system as claimed in claim 1, further comprising an indicator connected to the KBC for indicating whether the alarm system is enabled or not.

10. An anti-theft alarm system for a portable computer, the anti-theft alarm system comprising:

a detecting switch portion comprising a first switch and a second switch, the second switch being deformable under pressure exerted by a weight of the portable computer;

a keyboard controller (KBC) for outputting an enable signal to the first switch to activate the alarm system and protect the portable computer from theft;

a key of a keyboard of the portable computer for delivering an alarm system enabling signal to the KBC and causing the KBC to output the enable signal; and an audio system connected to the KBC, wherein if the portable computer is moved without deactivation of the alarm system, the second switch opens, causing a change of a voltage at the first switch, which is detected by the KBC, the KBC thereby sends an alarm control signal to the audio system of the portable computer, and the audio system produces an audible sound for a theft deterrence effect;

wherein the audio system comprises:

a speaker;

a codec for converting the alarm control signal to an analog audio signal;

an audio amplifier for amplifying the analog audio signals to make the speaker sound an alarm; and a transistor, the transistor having a collector connected to an earphone input of the audio amplifier and a base receiving an earphone bypass input signal from the KBC for making the speaker sound the alarm even if an earphone is plugged into the portable computer.

11. The anti-theft alarm system as claimed in claim 10, wherein the first switch is an electronic switch, the second switch is a mechanical switch, and the second switch is mounted in a cushion of the portable computer.

12. The and-theft alarm system as claimed in claim 11, wherein the detecting switch portion further comprises a diode connected between the electronic switch and the KBC for avoiding leakage.

13. The anti-theft alarm system as claimed in claim 10, wherein the KBC outputs a mute-disabling signal to the audio amplifier for disabling a possible mute status of the audio system.

14. The anti-theft alarm system as claimed in claim 10, further comprising a central processing unit connected to the audio system via a memory controller hub (MCH) and an input/output controller hub (ICH) for calling an audio driver when the KBC outputs the alarm control signal.

15. The anti-theft alarm system as claimed in claim 10, further comprising a memory connected to the KBC for storing a password to be input to the portable computer for enabling and/or disabling the alarm system.

16. The anti-theft alarm system as claimed in claim 10, further comprising an indicator connected to the KBC for indicating whether the alarm system is enabled or not 17. An anti-theft alarm system for a portable computer, the anti-theft alarm system comprising:

a detecting switch portion comprising a first switch and a second switch;

a controller configured for outputting an enable signal to the first switch to activate the alarm system and protect the portable computer from theft;

wherein the portable computer comprises a chassis, a user input device, a screen and a central processing unit, and wherein the user input device, the screen and the central processing unit are located within the chassis;

a button configured for delivering an alarm system enabling signal to the controller and causing the controller to output the enable signal; wherein if the portable computer is moved without deactivation of the alarm system, the second switch opens, causing a change of a voltage at the first switch which is detected by the controller, the controller thereby sends an alarm control signal to an audio system of the portable computer, and the audio system produces an audible sound for a theft deterrence effect;

wherein the audio system comprises:

a speaker;

a codec for converting the alarm control signal to an analog audio signal;

an audio amplifier for amplifying the analog audio signals to make the speaker sound an alarm; and a transistor, the transistor having a collector connected to an earphone input of the audio amplifier, and a base receiving an earphone bypass input signal from the KBC for making the speaker sound the alarm even if an earphone is plugged into the portable computer.

* * * * *